Patented Dec. 28, 1937

2,103,880

UNITED STATES PATENT OFFICE 2,103,880

PRODUCTION OF ORGANIC SULPHUR COMPOUNDS

Hanns Ufer, Ludwigshafen-on-the-Rhine, Germany, assignor to I. G. Farbenindustrie Aktiengesellschaft, Frankfort-on-the-Main, Germany No Drawing. Application November 22, 1935, Serial No. 51,082. In Germany December 17, 1934

7 Claims. (Cl. 260—158)

This invention relates to the production of organic sulphur compounds.

In my copending application Ser. No. 51,081 filed November 22, 1935 I have described a process for producing organic sulphur compounds according to which vinyl sulphones of the general formula $R(SO_2-CH=CH_2)_x$ in which R is a saturated or unsaturated aliphatic radicle containing at least seven carbon atoms and $x$ is a whole number are caused to react with bisulphites of the light metals such as sodium, potassium or calcium.

I have now found that vinyl sulphones having the general formula $R(SO_2-CH=CH_2)_x$ in which R is an isocyclic or heterocyclic radicle and $x$ is a whole number can also be caused to react with bisulphites of the light metals.

The vinyl sulphones employed as starting materials are for example obtainable by reacting the corresponding vinyl sulphides with peroxidic oxidizing agents or hypochlorites under mild conditions. For example vinyl sulphones of the above formula in which R is an isocyclic radicle, as for example the radicle of benzene, toluene, naphthalene, anthracene, phenanthrene, anthraquinone or benzanthrone or another polynuclear isocyclic compound, as for example phenyl vinyl sulphone, tolyl vinyl sulphone, beta-naphthyl vinyl sulphone or 1-chlor-8-naphthyl vinyl sulphone, or in which R is a cycloaliphatic radicle, as for example the radicle of cyclohexane or tetrahydronaphthalene may be used for the present reaction. There may also be employed vinyl sulphones of the above formula in which R is a heterocyclic radicle, as for example the radicle of pyridine, quinoline, benzothiazole or benzimidazole. The said vinyl sulphones may contain the $-(SO_2CH=CH_2)-$ group more than once in the molecule and may then be caused to react a corresponding number of times. They may also contain other atoms or atomic groups, as for example halogen atoms or hydroxyl, alkyl, alkoxy, hydroxyalkyl, nitro, amino, carboxyl or sulphonic acid groups. The isocyclic or heterocyclic radicles may also be combined with the vinyl sulphone groups by means of aliphatic groups, such as in phenyl-methyl vinyl sulphone or phenyl-ethyl vinyl sulphone.

During the reaction, which is preferably carried out in the presence of solvents or diluents, for example water or aqueous alcohol, and if desired under pressure, the bisulphite adds on to the vinyl groups with the formation of sulphonic acid salts.

The new compounds may be employed for example for the preparation of dyestuffs or, by employing appropriate initial materials, as dyestuffs themselves or as assistants for the textile and related industries.

The following examples will further illustrate how the present invention may be carried out in practice but the invention is not restricted to these examples. The parts are by weight.

Example 1

18 parts of vinyl para-tolyl sulphone and 50 parts of a from 38 to 40 per cent solution of sodium bisulphite are heated under reflux at about 100° C. for seven hours while continuously or periodically stirring. The fused sulphone, originally floating as an oil on the aqueous layer, gradually passes into solution. After cooling, the resulting crystal pulp is separated from the mother liquor. The new compound may be obtained in a pure form by crystallization from a large amount of alcohol or a small amount of water. It probably has the composition

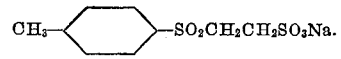

It forms colorless crystals which dissolve very readily in water. By adding a solution of barium chloride or barium hydroxide to an aqueous solution of the new compound which is not too dilute, the barium salt is precipitated and may be crystallized from water. It has a comparatively good solubility in water.

Example 2

20 parts of vinyl beta-naphthyl sulphone are treated with 60 parts of a from 38 to 40 per cent solution of sodium bisulphite. The whole solidifies immediately to form a crystal pulp. After adding 100 parts of water, the whole is heated for some time at about 100° C. Any undissolved constituents are then removed by filtration of the hot solution. When the latter is cooled, a compound crystallizes out the composition of which probably corresponds to the formula:

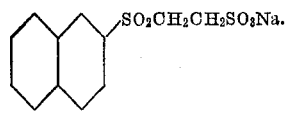

Corresponding compounds are obtained with other vinyl sulphones of the said kind and with other bisulphites, as for example calcium or potassium bisulphite.

What I claim is:—

1. The process of producing organic sulphur compounds which comprises reacting vinyl sulphones having the general formula $$R(SO_2\text{—}CH\text{=}CH_2)_x$$

in which R is a cyclic radicle selected from the group consisting of isocyclic and heterocyclic radicles and $x$ is a whole number, with bisulphites of light metals selected from the group consisting of sodium, potassium and calcium.

2. The process of producing organic sulphur compounds which comprises reacting vinyl sulphones having the general formula $$R(SO_2\text{—}CH\text{=}CH_2)_x$$

in which R is a cyclic radicle selected from the group consisting of isocyclic and heterocyclic radicles and $x$ is a whole number, with bisulphites of light metals selected from the group consisting of sodium, potassium and calcium in the presence of a diluent selected from the group consisting of water and aqueous alcohol.

3. The process of producing organic sulphur compounds which comprises reacting vinyl sulphones having the general formula $$R(SO_2\text{—}CH\text{=}CH_2)_x$$

in which R is a cyclic radicle selected from the group consisting of isocyclic and heterocyclic radicles and $x$ is a whole number, with bisulphites of light metals selected from the group consisting of sodium, potassium and calcium in the presence of water.

4. The process of producing organic sulphur compounds which comprises reacting vinyl sulphones having the general formula $$R(SO_2\text{—}CH\text{=}CH_2)_x$$

in which R is a cyclic radicle selected from the group consisting of isocyclic and heterocyclic radicles and $x$ is a whole number, with bisulphites of light metals selected from the group consisting of sodium, potassium and calcium in the presence of aqueous alcohol.

5. Sulphonic acid salts of the general formula $R(SO_2\text{—}CH_2\text{—}CH_2\text{—}SO_3Me)_x$ in which R is a cyclic radicle selected from the group consisting of isocyclic and heterocyclic radicles, Me is a light metal selected from the group consisting of sodium, potassium and calcium and $x$ a whole number.

6. Tolyl-sulphone-ethyl-sulphonic acid sodium salt.

7. Beta-naphthyl-sulphone-ethyl-sulphonic acid sodium salt.

HANNS UFER.